(12) United States Patent
Seelinger et al.

(10) Patent No.: US 8,229,595 B2
(45) Date of Patent: Jul. 24, 2012

(54) METHOD AND SYSTEM FOR PROVIDING AUTONOMOUS CONTROL OF A PLATFORM

(76) Inventors: Michael J. Seelinger, South Bend, IN (US); John-David Yoder, Bluffton, OH (US)

( * ) Notice: Subject to any disclaimer, the term of this patent is extended or adjusted under 35 U.S.C. 154(b) by 323 days.

(21) Appl. No.: 12/487,757

(22) Filed: Jun. 19, 2009

(65) Prior Publication Data

US 2010/0234993 A1 Sep. 16, 2010

Related U.S. Application Data

(60) Provisional application No. 61/074,092, filed on Jun. 19, 2008.

(51) Int. Cl.
*G05B 19/04* (2006.01)
*G05B 19/18* (2006.01)

(52) U.S. Cl. ........ 700/254; 700/245; 700/250; 700/253; 700/259

(58) Field of Classification Search .................. None
See application file for complete search history.

(56) References Cited

U.S. PATENT DOCUMENTS

| | | | | |
|---|---|---|---|---|
| 5,321,353 | A * | 6/1994 | Furness | 318/568.11 |
| 5,758,298 | A * | 5/1998 | Guldner | 701/23 |
| 5,974,348 | A * | 10/1999 | Rocks | 701/28 |
| 6,194,860 | B1 | 2/2001 | Seelinger et al. | |
| 6,671,582 | B1 * | 12/2003 | Hanley | 700/245 |
| 7,233,683 | B2 * | 6/2007 | Han et al. | 382/104 |
| 7,765,780 | B2 * | 8/2010 | Koselka et al. | 56/10.2 A |

OTHER PUBLICATIONS

Seelinger, et al., "High-Precision Visual Control of Mobile Manipulators", IEEE Transactions on Robotics and Automation, vol. 18, No. 6, pp. 957-965, Dec. 2002.
Huntsberger, et al., "Rover Autonomy for Long Range Navigation and Science Data Acquisition on Planetary Surfaces", Proceedings of the 2002 IEEE International Conference on Robotics and Automation, Washington, D.C., pp. 3161-3168, May 2002.
Huntsberger, et al., "Closed Loop Control for Autonomous Approach and Placement of Science Instruments by Planetary Rovers", IEEE Conf. on Intelligent Robots and Systems IROS2005, Edmonton, Canada, Aug. 2-6, 2005.
Pedersen, et al., "Mission Planning and Target Tracking for Autonomous Instrument Placement", Aerospace, 2005 IEEE Conference, Mar. 5-12, 2005 pp. 1-18.

(Continued)

*Primary Examiner* — Khoi Tran
*Assistant Examiner* — Bhavesh V Amin
(74) *Attorney, Agent, or Firm* — McDonnell Boehnen Hulbert & Berghoff LLP (57) ABSTRACT

The present application provides a system for enabling instrument placement from distances on the order of five meters, for example, and increases accuracy of the instrument placement relative to visually-specified targets. The system provides precision control of a mobile base of a rover and onboard manipulators (e.g., robotic arms) relative to a visually-specified target using one or more sets of cameras. The system automatically compensates for wheel slippage and kinematic inaccuracy ensuring accurate placement (on the order of 2 mm, for example) of the instrument relative to the target. The system provides the ability for autonomous instrument placement by controlling both the base of the rover and the onboard manipulator using a single set of cameras. To extend the distance from which the placement can be completed to nearly five meters, target information may be transferred from navigation cameras (used for long-range) to front hazard cameras (used for positioning the manipulator).

11 Claims, 6 Drawing Sheets

OTHER PUBLICATIONS

Smith, et al., "SUSAN—A New Approach to Low Level Image Processing", International Journal of Computer Vision, vol. 23, No. 1, pp. 45-78, 1997.

Backes, et al., "Automated Rover Positioning and Instrument Placement", IEEE Aerospace Conference, pp. 1-12, Mar. 2005.

Baumgartner, et al., "Mobile Manipulation for the Mars Exploration Rover", IEEE Robotics & Automation Magazine, vol. 13, No. 2, pp. 27-36, Jun. 2006.

Lowe, "Distinctive Image Features from Scale-Invariant Keypoints", International Journal of Computer Vision, vol. 60, No. 2, pp. 91-110, 2004.

Gennery, "Least-Squares Camera Calibration Including Lens Distortion and Automatic Editing of Calibration Points", Calibration and Orientation of Cameras in Computer Vision, A. Grun and T. Huang Editors, Springer Series in Information Sciences, vol. 34, Springer-Verlag, pp. 123-136, Jul. 2001.

Maimone, et al., "Autonomous Navigation Results from the Mars Exploration Rover (MER) Mission", Springer Tracts in Advanced Robotics, vol. 21, pp. 3-13, Mar. 2006.

Baumgartner, et al., "Sensor-Fused Navigation and Manipulation from a Planetary Rover", Sensor Fusion and Decentralized Control in Autonomous Robotic Systems, SPIE Proc. vol. 3523, pp. 58-66, Boston, MA, Oct. 1998.

Ke, et al., "PCA-SIFT: A More Distinctive Representation for Local Image Descriptors", Proc. of the IEEE Conference on Computer Vision and Pattern Recognition (CVPR), 2004.

Lucas, et al., "An Iterative Image Registration Technique with an Application to Stereo Vision", International Joint Conference on Artificial Intelligence, Vancouver, British Columbia, pp. 674-679, Aug. 24-28, 1981.

Yoder, et al., "Visual Coordination of Heterogeneous Mobile Manipulators", Springer Tracts in Advanced Robotics, vol. 21, pp. 387-396, Mar. 2006.

* cited by examiner

METHOD AND SYSTEM FOR PROVIDING AUTONOMOUS CONTROL OF A PLATFORM

CROSS-REFERENCE TO RELATED APPLICATION

The present patent application claims priority under 35 U.S.C. §119(e) to U.S. Provisional Patent Application Ser. No. 61/074,092, filed on Jun. 19, 2008, the full disclosure of which is entirely incorporated herein by reference.

STATEMENT OF GOVERNMENT RIGHTS

The work disclosed in this application was supported in part by a grant from the NASA-SBIR program to Yoder Software, Inc. having contract no. NNG05CA89C, therefore, the U.S. Government may have some rights in the present invention.

FIELD

The present application relates generally to the control of an autonomous vehicle, and in particular, to the use of at least two cameras and an on-board manipulator to achieve high-precision control.

BACKGROUND

The Mars Exploration Rovers (MER) have been successful in the field of robotics. The basic function has been described by Dr. Larry Matthies in M. Maimone, A. Johnson, Y. Cheng, R. Willson, L Matthies, "Autonomous Navigation Results from the Mars Exploration Rover (MER) Mission," *Springer Tracts in Advanced Robotics*, Vol. 21, pp. 3-13 Mar. 2006. The rovers have acquired and transmitted an enormous amount of scientific data over the past few years. Much of this data has been obtained through use of an Instrument Deployment Device (IDD), a cluster of instruments mounted on a 5-depth of field (DOF) robotic arm. The arm is stowed during navigation and deployed once a mobile base of the rover has moved into position close enough to a target (e.g., a rock formation). For example, a microscopic imager may require precise placement relative to the target to acquire accurate, in-focus images of the feature. This requires human operators to work with scientists to identify points of interest and plan routes to navigate the mobile base toward the target. After one or two navigation cycles (each taking a day), the operators send a list of commands to the IDD, which deploys the instrument and takes requested measurements. Accuracy of the measurements may depend upon precision with which the IDD can place the instruments relative to the target. Because of multiple instructions may be required to place the instruments, and thus multiple messages are sent to and received by the rover, the process of acquiring measurements once a target has been identified can require multiple Martian days (referred to as "sols") due to time required to receive instructions (e.g., rovers are commanded with new directives every sol).

Existing technology related to control of autonomous vehicles typically separates control of a mobile base of a scientific exploration rover from control of onboard robotic arms. Separation of the control requires human intervention once the mobile base of the rover has moved into position in order to receive instructions regarding arm deployment for placing scientific instruments at a desired target.

In addition, in the case of planetary exploration, for distances that exceed a field of view of a set of cameras controlling positioning of the robotic arm on the rover, it may be necessary to first identify the target using a secondary set of cameras. En route to the target, the rover would then transfer a field of view of the target and control of the mobile robotic arm from the secondary set of cameras to a set of cameras that will eventually perform the final precision positioning. When performing a transfer of the target, it can be difficult to relocate the target using the new set of cameras.

Similar problems exist in other applications. For example, when a forklift operator attempts to engage a pallet located tens of feet above a truck, a view angle makes alignment of the fork with the pallet difficult. Some forklifts include cameras used for guiding both the forks and a mobile base of the forklift, and are rigidly mounted to the body of the forklift. The cameras' range of view may be incapable of seeing both the ground level as well as pallets located in high shelves. To enable engagement of pallets in high shelves, a set of cameras may be positioned on the fork carriage itself. Thus, as the forks move upwards through a vertical range, the cameras' fields of view will include the pallets in that range that the forks are capable of engaging. With two sets of cameras on the same forklift vehicle, there may be a need to transition visual target information from the cameras on the forklift body to the cameras traveling with the forks.

SUMMARY

The present application provides a means for the capability of autonomous, vision-guided, high precision positioning by mobile manipulators from short to long ranges, depending on the types and number of camera systems used. A system is provided that allows for the ability to precisely position both a mobile base of a rover as well as an onboard robotic arm using a stereo-pair camera configuration, or other configuration of multiple cameras, for visual guidance.

The present application describes the development of high-precision, single-Martian-day (sol) instrument placement with a single set of stereo cameras including a series of pairs of cameras and transfer of visual targets between each pair of cameras. The autonomous control of the mobile base provides for movement to an area of interest and control of an arm that is deployed when the base reaches a target. The range of the instrument placement can be over eight meters, for example.

The present application incorporates methods and techniques as used within a method of mobile camera-space manipulation (MCSM), which was developed for high-precision visual control of mobile manipulators, and is presented in U.S. Pat. No. 6,194,860, the contents of which are incorporated herein by reference as if fully set forth in this application.

The present application describes a system that may be used in a variety of applications. For example, the system may be used in any machine that has a holonomic manipulator attached to a mobile base, such as a forklift system or automatically guided vehicle system (AGV).

In example embodiments, the present application provides a method for operating an autonomous vehicle that includes a manipulator, a first set of cameras on the autonomous vehicle, and a second set of cameras on the autonomous vehicle. The method includes calibrating the manipulator with the first set of cameras and the second set of cameras to establish calibration parameters describing a relationship between a location of features of the manipulator in a two-dimensional image acquired by the first set of cameras and the second set of cameras and a three-dimensional position of the features of the manipulator. The method also includes defining a relationship between a three-dimensional location of a target and a location of the target in a two-dimensional image acquired by the first set of cameras, and using the calibration parameters and the relationship between the three-dimensional location of the target and the location of the target in the two-dimensional image acquired by the first set of cameras to estimate a location of the target relative to the manipulator. The method further includes creating a trajectory for the autonomous vehicle and the manipulator to follow to position the autonomous vehicle and the manipulator such that the manipulator can engage the target, and updating the trajectory as the autonomous vehicle and the manipulator traverse the trajectory.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

DETAILED DESCRIPTION

The present application presents a system for enabling a mobile manipulator (e.g., an onboard robotic arm) of an autonomous vehicle to position a tip of an end of the manipulator accurately relative to a visually-distinctive target. The system has shown an ability to repeatedly position the tip within approximately a few millimeters of the target in a direction perpendicular to the object of interest.

In one embodiment, the present application provides a manner of minimizing a number of human interactions required in order to place the desired instrument accurately relative to that target. As such, the present application provides a means for allowing simple target selection based on images taken while far (greater than 8 m, for example) from the target. Once the target is selected, the system autonomously moves the mobile base and positions the tool tip a specified distance (usually 8 mm in this example) from the target. Note that the rovers typically perform motion and data collection during the Martian day, and then send the data back to Earth before shutting down for night. As such, an entire day is usually available for gathering a set of data. This means that the rovers can move quite slowly.

A method of Autonomous Go-and-Touch Exploration (AGATE) has been developed, and tested to allow for single-sol instrument placement from varying distances. The range of AGATE is dependent on the number of pairs of cameras used and the field of view of the particular cameras used.

Figure 1:
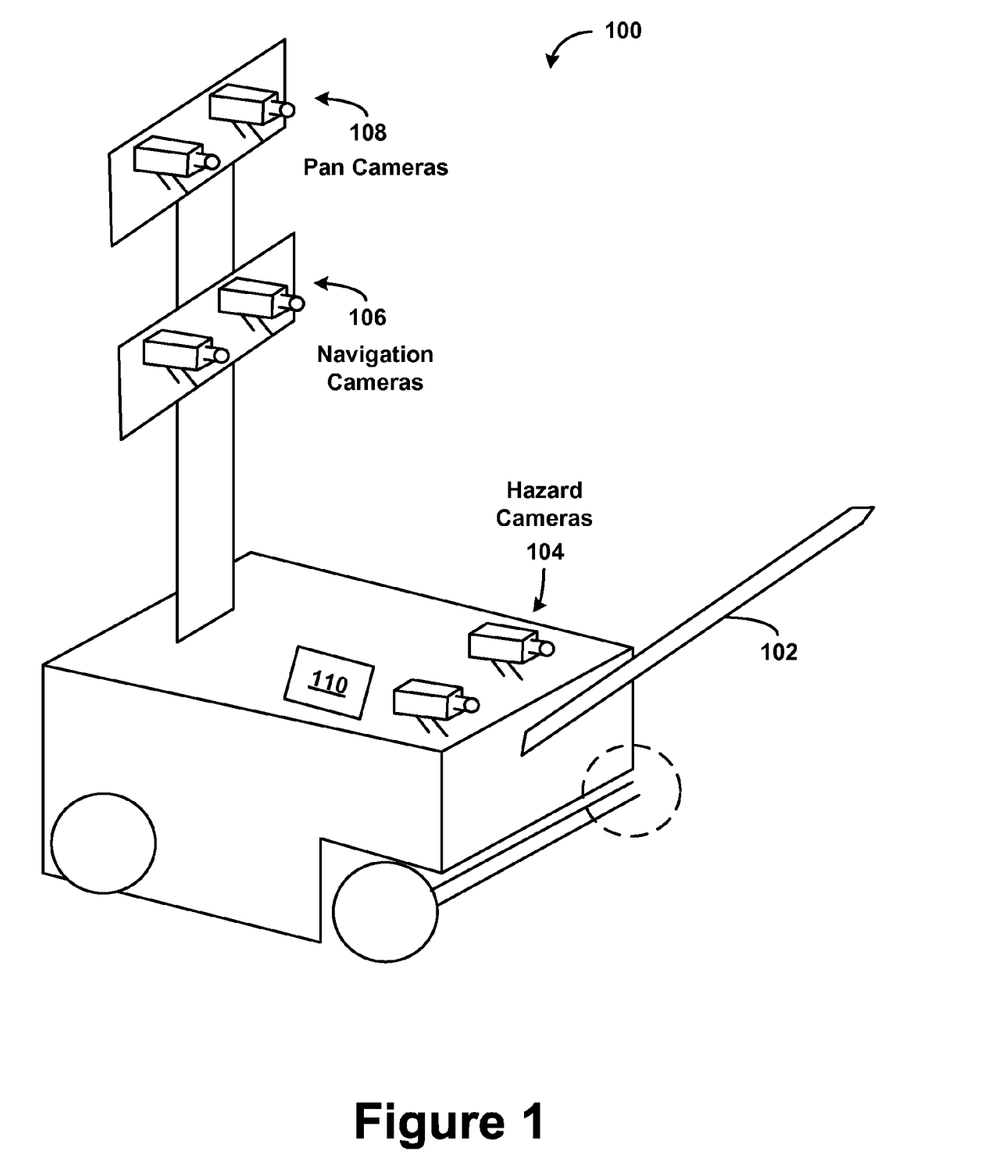
FIG. 1 illustrates an example of a system including camera placement according to the present application.

FIG. 1 illustrates an example system 100 that includes a mobile manipulator 102, a pair of hazard cameras 104, a pair of navigation cameras 106, a pair of panoramic cameras 108 and a laser 110.

The mobile manipulator 102 may be a 5-degree-of-freedom (DOF) robotic arm that can be stowed during navigation and deployed once a mobile base of the system has moved into position close enough to a target. As another example, the mobile manipulator 102 may be a 1-DOF arm with a reach of approximately 75 cm. Thus, the mobile manipulator 102 may have an assortment of attachments at a tip of the manipulator 102 for engaging a target, for example. The number or arrangement of the DOF of the arm is not limited by this method.

Depending on an application of the system 100, the mobile manipulator 102 may be a holonomic manipulator, a robotic arm, a lift on a forklift, or any other number of apparatuses or members attached to the system that may be operated to move independently of the system, for example.

The pair of hazard cameras 104 may be mounted on a front of a base of the system 100. The Hazcams may have a baseline separation of about 170 mm.

The pair of navigation cameras 106 may be mounted on a mast extending vertically about 2 m from the back of the system 100. The pair of navigation cameras 106 may have a baseline separation of about 250 mm. A midpoint between the two cameras may be along a centerline of the system 100. A downlook angle of the pair of navigation cameras 106 may be about 35 degrees.

Each of the hazard cameras 104 and navigation cameras 106 may be a "Flea" camera manufactured by Point Grey Research Inc. of Richmond, British Columbia, Canada. The camera may be a black-and-white, FireWire model with resolution of 1024 by 768 pixels, for example.

Any number of hazard cameras 104 and navigation cameras 106 may be used. Although two of each are illustrated in FIG. 1, more than two of each may be used. In addition, although the pairs of cameras are illustrated to be positioned close to each other, the pairs of cameras may be positioned apart from one another, such as for example, one on each side of a base of the system 100.

When the mobile manipulator 102 is fully deployed, the pair of hazard cameras 104 display features at an end of the mobile manipulator 102 with a resolution of about 1.6 mm/pixel. The pair of navigation cameras 106 display the same features at about 2.1 mm/pixel.

The system 100 may include an additional set of cameras located at either side of a front end of a base of the system 100. These cameras may be angled in toward each other to provide additional views of the system 100.

The system 100 may use mobile camera space manipulation (MCSM) control strategies to maneuver. MCSM uses CSM as a vision-guided control strategy for holonomic manipulators. CSM may require at least two cameras to control a system of three or more degrees of freedom. While precise location of the cameras is not necessary, the cameras need to remain stationary relative to the mobile system. CSM uses an orthographic camera model as well as a nominal kinematic model of the system to estimate a relationship between each of the camera spaces and a joint space of the system. This is accomplished by moving the system through a set series of poses. At each pose, images from each of the cameras are acquired and angles and positions of all the joints are recorded. In each of the images, the system identifies the camera-space locations of specific manipulator features. Parameters describing a relationship between an appearance of manipulator features in an image and the joint space of the system are established.

However, MCSM may be limited to the orthographic camera model, which limits accuracy, and limits flexibility due to required separated, non-parallel cameras. This limits both performance and the ability to see targets far away in a pair of cameras located on the vehicle. Within example embodiments described herein, accuracy and flexibility are improved using the methods described below.

In order to position the manipulator at a target, a location of the target is identified in the camera spaces. With the camera-space target information and the previously established estimated relationship, the system can determine a joint configuration of the system necessary to position the manipulator at the specified target location. As more visual information becomes available to the system, the estimated relationship can be updated. This relationship can be skewed favoring measurements that are taken more closely to the target location in camera and joint space.

A relationship between the manipulator onboard the mobile system 100 and the cameras 104 mounted to a base of the mobile system 100 can be generated. For example, a target for engagement is visually specified as locations in the camera spaces, and an estimated relationship between the camera-space location of features on the manipulator and the joint space of the manipulator can be made to estimate a location of the target object relative to the mobile manipulator 102. A trajectory can then be created for the mobile manipulator 102 to follow in order to position the system 100 such that the manipulator 102 can then engage the target.

The laser 110 of the system 100 can be mounted on a pan/tilt unit (PTU) to share target information between cameras of the system 100. The laser 110 provides an accurate way to identify the same feature in the camera spaces of two cameras. For example, a target may be chosen in an image taken from the cameras 104. The system 100 can position the laser 110 such that the laser 110 projects a spot onto the target. The camera-space location of the laser spot (e.g., location of the laser within the image obtained by the cameras 104) can then be identified within a image obtained by the cameras 106 to precisely locate the target feature in both of the camera spaces.

The system 100 may use the CAHVOR camera model. The CAHVOR camera model is described in Donald B. Gennery, "Least-Squares Camera Calibration Including Lens Distortion and Automatic Editing of Calibration Points," in *Calibration and Orientation of Cameras in Computer Vision*, A. Grun and T. Huang Editors, Springer Series in Information Sciences, Vol. 34, Springer-Verlag, pp. 123-136, July 2001 which is entirely incorporated by reference herein.

Generally, the CAHVOR camera model describes a relationship between a 3-D location of a point and an appearance of the same point in a 2-D image acquired by a camera. CAHVOR includes six vectors of three parameters each for a total of eighteen camera model parameters:

$\underline{c} = \{c0, c1, c2\}$
$\overline{a} = \{a0, a1, a2\}$
$\overline{h} = \{h0, h1, h2\}$
$\overline{v} = \{v0, v1, v2\}$
$\overline{o} = \{o0, o1, o2\}$
$\overline{r} = \{r0, r1, r2\}$ The CAHVOR camera model is summarized in equation form below.

$$x = \frac{(\underline{p}' - \underline{c}) \times \underline{h}}{(\underline{p}' - \underline{c}) \times \underline{a}} \quad y = \frac{(\underline{p}' - \underline{c}) \times \underline{v}}{(\underline{p}' - \underline{c}) \times \underline{a}} \quad [1]$$

where, $$\underline{p}' = \underline{p} + \mu \underline{\lambda} \quad [2]$$

-continued $$\mu = r_0 + r_1 \tau + r_2 \tau^2 \quad [3]$$

$$\tau = \frac{\underline{\lambda} \times \underline{\lambda}}{\zeta^2} \quad [4]$$

$$\underline{\lambda} = \underline{p} - \underline{c} - \zeta \underline{o} \quad [5]$$

$$\zeta = (\underline{p} - \underline{c}) \times \underline{o} \quad [6]$$

The 3-D location of a point is described by the vector, $\underline{p}$. The 2-D camera-space location of the point is described with coordinates (x,y).

Figure 2:
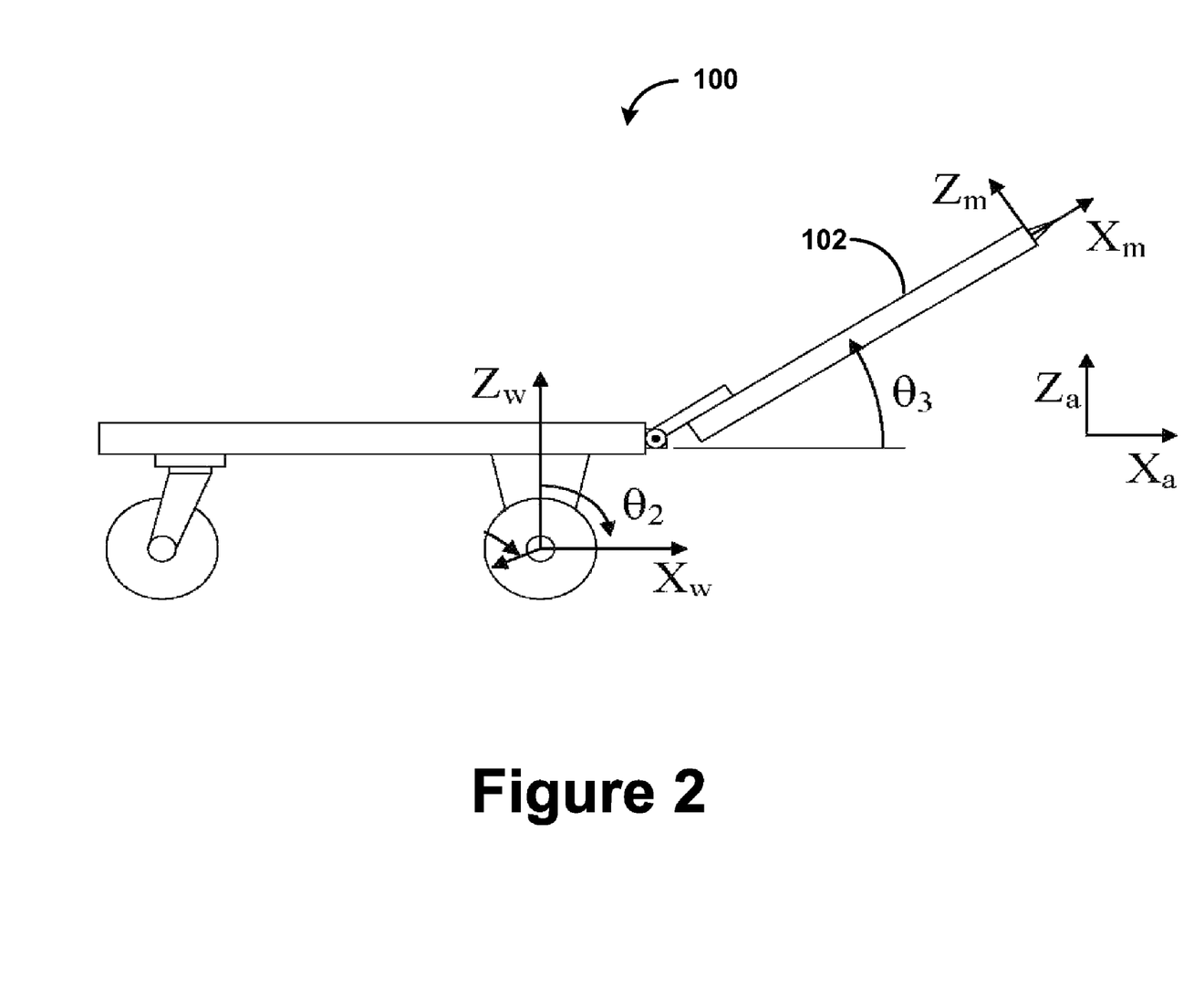
FIG. 2 illustrates an example side view of the system of FIG. 1.

In order to use a camera, or stereo-pair cameras, or some other configuration of cameras, for positioning the system 100 and/or the mobile manipulator 102, eighteen camera model parameters of the CAHVOR camera model for each camera in use can be determined. To determine the camera model parameters, recognizable features can be placed on the robotic arm. Such features are often referred to as fiducials or cues. The fiducials may take the form of concentric black and white circles, for example, located at an end of the arm. The robotic arm can be moved through a series of positions, and at each position a pose of the arm is determined. FIG. 2 illustrates an example side view of the system 100, as in the case of an example arm that has only one DOF, the angle of the arm, $\theta_3$, is determined. The locations of the fiducials relative to some fixed point of the arm are known, and the fixed point could be the origin (Xm, Ym, Zm) of the coordinate system as shown in FIG. 2. Then, using forward kinematics, the location (Xa, Ya, Za) of each fiducial relative to a coordinate system fixed to the rover is determined. These (Xa, Ya, Za) values correspond to the $\underline{p}$ vector in Equations [2], [5], and [6]. At each of the poses, images are acquired in camera(s) of interest. The camera-space location of each fiducial (x,y) is found by identifying the camera-space location of a center of a fiducial to within a small fraction of a pixel. If sufficient samples are acquired, the values for the CAHVOR camera model parameters can be determined.

The system 100 may also self-calibrate the cameras 104 and 106. Camera-space residuals for each pair of camera-space/3-D fiducial locations can be computed as:

$$B_1 = \sqrt{(x_{actual} - x_{predicted})^2 + (y_{actual} - y_{predicted})^2} \quad [7]$$

where $(x_{actual}, y_{actual})$ is the actual camera-space location found in the images and $(x_{predicted}, y_{predicted})$ is the predicted value for the camera-space location using the camera model parameters, the 3-D location of the point, and Equation [1]. The average residual for any given camera is usually on the order of about 0.1 pixels.

An ability of the system 100 to self-calibrate by computing CAHVOR camera model parameters for each camera enables the system 100 to recalibrate to adjust for any changes in the camera model parameters that can occur due to physical movement of the camera or robotic arm due to system vibration, unexpected impacts, changes in environmental operating conditions, etc.

All of the cameras may be initially uncalibrated. It should be noted that each of the cameras forming a pair are approximately parallel, but the true relationship between the cameras is not known, nor is this information necessary for the AGATE process. On power-up, the system self-calibrates by moving the arm through the field-of-view of the three sets of cameras. Images of the arm are acquired by all of the cameras on the rover.

The system automatically identifies the camera space locations of easily-recognized features at known locations on the arm. Using the nominal forward kinematic model of the arm and the known pose of the arm when the images were acquired, sets of 2-D camera-space location points with their corresponding 3-D physical space location are created. Using this data with a least-squares minimization process, the system automatically identifies the camera model parameters for each camera. The self-calibration of all of the cameras on the rover system provides an advantage in that the camera-arm system is calibrated as one, in order to minimize the effects of any inaccuracies in calibration. Also, the system can update the camera-arm calibration at any time when new visual information is available, thus keeping the calibration current.

AGATE allows the system to automatically move toward a visual target. An operator defines this target with a simple point-and-click of the mouse on the target feature of interest. Once the target is established in one camera, the system can automatically determine the corresponding target in the other camera. This is performed, for example, with the aid of a laser pointer mounted on a 2-axis computer-controlled pant/tilt unit (PTU) following techniques described in M. Seelinger, J. D. Yoder, E. Baumgartner, S. Skaar. "High-Precision Visual Control of Mobile Manipulators," IEEE Trans. on Robotics and Automation, Vol. 18, No. 6, pp. 957-965, 2002. (The laser mounted on the PTU is shown in FIG. 1.) This laser-based transfer of the target is completed by 'lighting up' the target. For implementations not incorporating a laser pointer, the feature in one camera may be identified in other cameras using standard image feature matching algorithms such as template matching (more fully described below).

Once the system 100 has defined the relationship between the 3-D location of a point and an appearance of the same point in a 2-D image acquired by a camera using the CAHVOR camera model parameters, and the system 100 has calibrated the cameras, a target is defined. The camera-space target location along with the camera model parameters and Equations [1]-[6] are used to estimate a 3-D location for the target. This 3-D location will then be used to determine the target pose for the mobile manipulator 102 as well as to generate a trajectory for the system 100 to follow in order for the mobile manipulator 102 to engage the target.

The process for estimating the 3-D target location requires that the camera-space target location be known in at least two cameras. In operation, the camera-space target location may be known by either the pair of hazard cameras 104 or the pair of navigation cameras 106, or by any set of two or more cameras. The 3-D target location, vector p, is estimated by performing a least squares minimization of the following equation:

$$G_5 = \Sigma(x(\underline{p}'-\underline{c}) \times \underline{a} - (\underline{p}'-\underline{c}) \times \underline{h})^2 + (y(\underline{p}'-\underline{c}) \times \underline{a} - (\underline{p}'-\underline{c}) \times \underline{v})^2 \quad [8]$$

where the summation is performed over all the cameras used in the minimization. Note that each camera has a unique camera-space target location as well as unique camera model parameters. Since these equations are highly nonlinear in p, the least squares minimization process involves a Newton-Raphson iterative procedure. The system usually converges to a value for p within a few iterations.

In an example simulation, a pre-plan trajectory was performed to initialize estimates for camera model parameters. Then, the robotic arm was sent to a specific pose at which images were acquired and the camera-space locations of the fiducials on the arm were found. These camera-space locations for the fiducials were used with the camera model parameters and Equation [8] to estimate a "predicted" 3-D location for the target. Since the arm was at a known location, the actual 3-D location of the fiducials could be computed using the forward kinematics of the robotic arm. The experiments involved computed a residual for the 3-D point estimation defined by:

$$B_2 = \sqrt{((p_x)_{actual} - (p_x)_{predicted})^2 + ((p_y)_{actual} - (p_y)_{predicted})^2 + ((p_z)_{actual} - (p_z)_{predicted})^2} \quad [9]$$

If the camera model as well as the kinematic model of the mobile manipulator 102 are perfect representations of the actual reality of the system and if the measurements have no error, then $B_2$ would be expected to have a value of zero for this residual. However, due to imperfections in the models, there is some measurement error. For the experiments performed, the average residual was 0.45 mm for the pair of hazard cameras 104 and 0.68 mm for the pair of the navigation cameras 106. Thus, the camera model parameters fit the data and are able to predict the 3-D target location based on a set of camera-space targets. As the 3-D target moves away from an end of the mobile manipulator 102 (for instance a rock that is several meters from the rover) the models are not as accurate at predicting the actual 3-D location of the target as when the target is in the same physical region as the fiducials on the mobile manipulator 102.

Once the camera-space locations of the target are found and the corresponding 3-D target location estimated, a trajectory for the system 100 to follow and a final target pose for the mobile manipulator 102 can be generated. Successful execution of the trajectory places the system 100 in position to engage a target object. Then, with the proper pose, the mobile manipulator 102 places an instrument at the target. The process for generating and following the trajectory as well as determining the final pose for the mobile manipulator 102 is similar to that used with MCSM.

Figure 3:
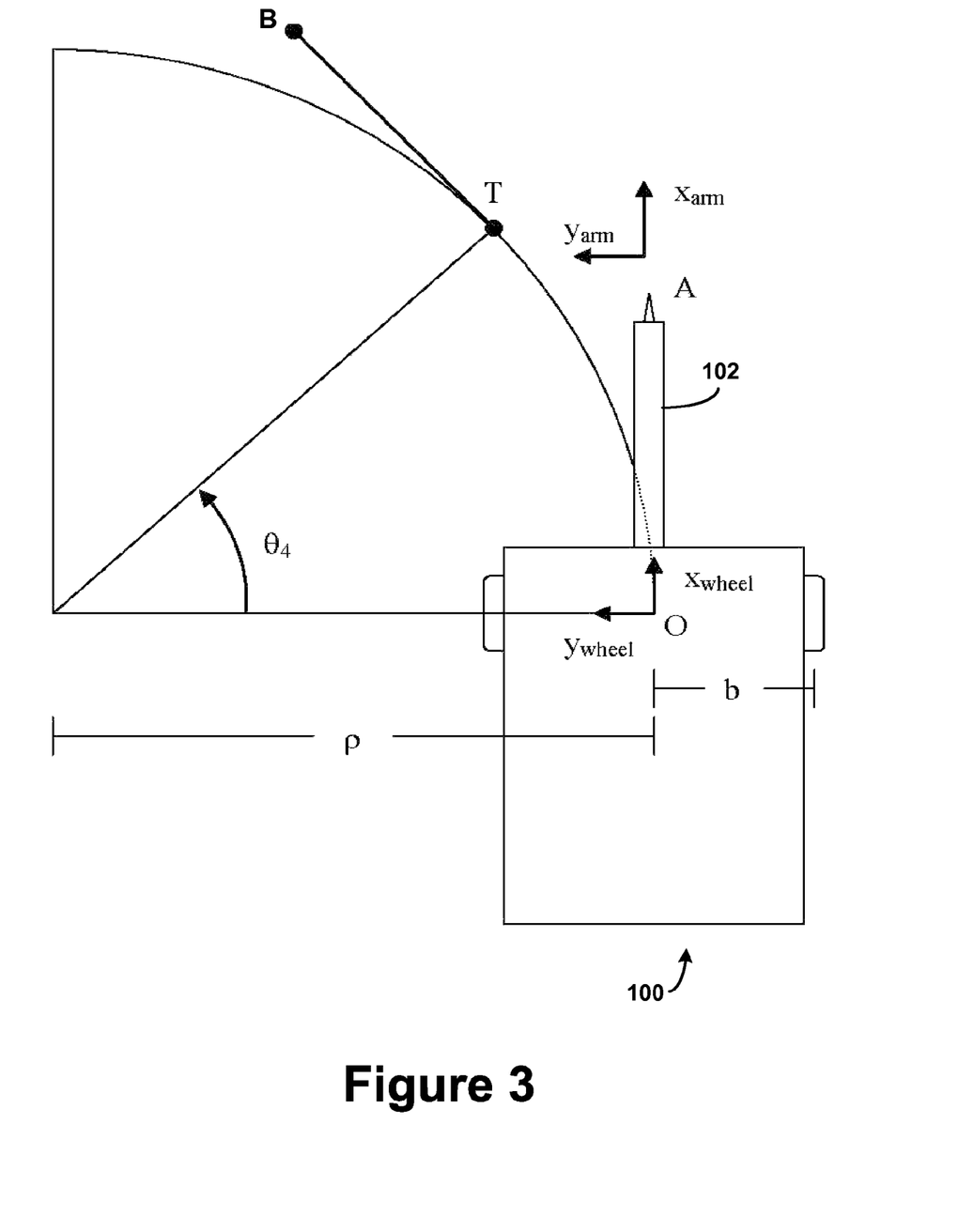
FIG. 3 illustrates an example top view of the system of FIG. 1.

FIG. 3 illustrates an example top view of the system 100. Positioning the system 100 co-locates a point, A, on the mobile manipulator 101 with the target point, B, as shown in FIG. 3. The point, A, is at a tip of an end of the mobile manipulator 102. Once zarm$_B$ (the zarm component of vector p referring to point B) has been estimated, the angle of the arm, $\theta_3$, can be determined which will locate point A on the mobile manipulator 102 with the desired target point B by using the kinematics of the mobile manipulator 102. For this case, the point A is measured relative to the (xm, ym, zm) coordinate system, which is shown in FIG. 3.

The next step is to create a trajectory for the system 100 to follow. A schematic of an arc of constant radius is shown in FIG. 3. Note that the (xarm, yarm, zarm) coordinate system in FIG. 3 is identical to the (xa, ya, za) coordinate system shown in FIG. 2. To plan a trajectory, the target point, (xarm$_B$, yarm$_B$, zarm$_B$), is known. Likewise, once $\theta_3$ is resolved, it is possible to use the forward kinematics to generate (xarm$_A$, yarm$_A$, zarm$_A$). A coordinate transformation is performed from the fixed (xarm, yarm, zarm) reference frame to the fixed (xwheel, ywheel, zwheel) reference frame (shown in FIG. 3). Note that a constant-radius arc is only one example of a possible trajectory from the current position to the target, but it provides a simple example.

This produces two points: (xwheel$_A$, ywheel$_A$, zwheel$_A$) and (xwheel$_B$, ywheel$_B$, zwheel$_B$). The points (xwheel$_A$, ywheel$_A$, zwheel$_A$) is the location of point A on the mobile manipulator 102 measured relative to the (xwheel, ywheel, zwheel) coordinate system. Likewise, (xwheel$_B$, ywheel$_B$, zwheel$_B$) is the location of the target point, B, measured relative to the same coordinate system. Remaining unknowns are xwheel$_T$, ywheel$_T$, ρ, and θ$_4$. These variables are all illustrated in FIG. 3, and the following equations are used to solve for these four unknowns.

$$\rho = \frac{x^2_{wheel_T} - y^2_{wheel_T}}{y_{wheel_T}} \quad [10]$$

$$x_{wheel_B} = x_{wheel_T} + x_{wheel_A}\cos\theta_4 - y_{wheel_A}\sin\theta_4 \quad [11]$$

$$y_{wheel_B} = y_{wheel_T} + x_{wheel_A}\sin\theta_4 + y_{wheel_A}\cos\theta_4 \quad [12]$$

$$\rho\cos\theta_4 = x_{wheel_T} \quad [13]$$

$$\rho\sin\theta_4 = \rho - y_{wheel_T} \quad [14]$$

With the radius of the arc, ρ, determined, the ratio of the drive wheel velocities are calculated using:

$$\frac{\dot{\theta}_1}{\dot{\theta}_2} = \frac{\rho - b}{\rho + b} \quad [15]$$

Note that θ$_1$ (not shown) is the angle of wheel 1 and θ$_2$ is the angle of wheel 2. To execute this trajectory, a motion control card, which controls two drive motors as well as an arm motor, maintains drive wheel 1 moving at a proper rate relative to drive wheel 2 to follow the desired arc. In practice, the system 100 moves through a percentage of the full trajectory created. While the system 100 is moving, the camera-space location of the target point is tracked. Whenever a new set of camera-space locations for the target point are available, updated estimates are generated for the target location: (x arm$_B$, yarm$_B$, zarm$_B$). With this information, a new trajectory can be created.

The accuracy of the estimates of (x arm$_B$, yarm$_B$, zarm$_B$) increases as the system 100 moves closer to the target. Thus, the precision with which an end-point of the arm can be collocated with the target point increases. In addition, if the system 100 overestimates the distance to the target, even by only a centimeter, damage could occur when the vehicle collides with the target. Therefore, in the normal course of a test, the system 100 executes several partial trajectories until the system 100 has determined that the target has been reached.

Figure 4:
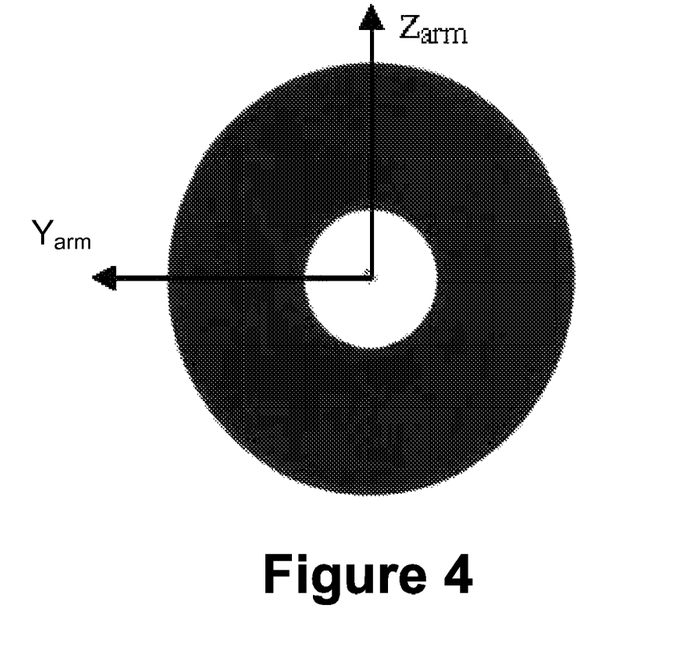
FIG. 4 illustrates an example fiducial on a portion of the system of FIG. 1.

A series of positioning experiments were performed using fiducials for the targets, and an example test is shown in FIG. 4. For each test option, 20 positioning tests were performed and an error for each test was measured and recorded. The positioning error in the yarm and zarm directions from each test is measured relative to the coordinate system. A standard caliper is used to measure these distances. The error in the direction normal to the yarm-zarm plane is the xarm error and can be thought of as the error in the direction normal to the target surface. This error is measured with a resolution of about ¼ mm. Average error in each direction along with the standard deviation of error is listed in Table 1 below. Four methods were performed and measurements were taken. One method included using measurements from the pair of hazard cameras 104, one method included using measurements from the pair of navigation cameras 106, and the remaining two method included using measurements from cameras located on either side of a front of the system. Error from each of the four methods is broken down by component. A root-mean-square (RMS) y$_{arm}$ error is also computed.

TABLE 1

Summary of Positioning Test Results Using Fiducials for Targets

|  | Hazcam | Navcam | cam-AGATE | cam-MCSM |
|---|---|---|---|---|
| Average x$_{arm}$ Error (cm) | −0.0238 | 0.1310 | 0.0225 | 0.1025 |
| Std Dev. x$_{arm}$ Error (cm) | 0.0329 | 0.0951 | 0.0228 | 0.0678 |
| Average y$_{arm}$ Error (cm) | −0.0091 | −0.0079 | 0.0010 | −0.0114 |
| Std Dev. y$_{arm}$ Error (cm) | 0.0254 | 0.0122 | 0.0212 | 0.0171 |
| Average z$_{arm}$ Error (cm) | −0.1547 | −0.0328 | −0.1119 | −0.0916 |
| Std Dev. z$_{arm}$ Error (cm) | 0.0401 | 0.0631 | 0.0296 | 0.0480 |
| Average in-plane Error (cm) | 0.1567 | 0.0529 | 0.1111 | 0.0984 |
| Std Dev. in-plane Error (cm) | 0.0387 | 0.0498 | 0.0291 | 0.0374 |

The positioning test results show that all methods are able to place the mobile manipulator 102 to within 0.15 cm of a target location. Of the methods, using the pair of hazard cameras 104 has a highest error. However, it should be noted that the standard deviation of the error using the pair of hazard cameras 104 in the z direction is smaller than that using the pair of navigation cameras 106.

Rather than just using one pair of cameras, when trying to start the process from a large distance (for example, 8 m), multiple sets of cameras are used. First, for example, the navigation cameras 106 are used. When the system 100 is sufficiently close to the target, the camera-space targets from the pair of navigation cameras 106 will be transferred to the pair of hazard cameras 104. Once the pair of hazard cameras 104 have information regarding the target, the pair of hazard cameras 104 will be used in lieu of the pair of navigation cameras 106 for controlling the system 100 and the mobile manipulator 102.

Regardless of whether the target is a fiducial or some feature natural to an object in view of a camera, camera-space targets are determined. In the case of the target fiducial, the center of the fiducial as found in the camera spaces serves as the camera-space targets. For a natural feature target, the process for defining the camera-space targets requires a user to select the target feature via a mouse point-and-click on the target feature as the feature appears in one of the cameras. For instance, if the positioning experiment involves control by the pair of hazard cameras 104, then the user selects the target feature in an image from the left hazard camera, for example. Once the target is established in one camera, the system 100 can determine the corresponding target in the other camera. This is performed with the aid of the laser 110 mounted on a 2-axis computer-controlled pant/tilt unit (PTU). For example, using image differencing, the system 100 identifies the camera-space location of the laser spot. Image differencing involves taking two images: one with the laser on and another with the laser off. The only difference in the two images is the appearance of the laser spot. By relating the camera-space location of the laser spot to the position of the pan and tilt angles of the PTU, a rough relationship is established between the 2-D location of the laser spot in the camera-space with the 2-DOF of the PTU. In operation, the relationship is used to move the laser spot to a desired camera-space location. In summary, then, a user selects the target feature for engagement by point-and-click in one of the cameras and then the system 100 positions the laser spot at this target location so that the system 100 can obtain the camera-space target location in the second camera.

Figure 5:
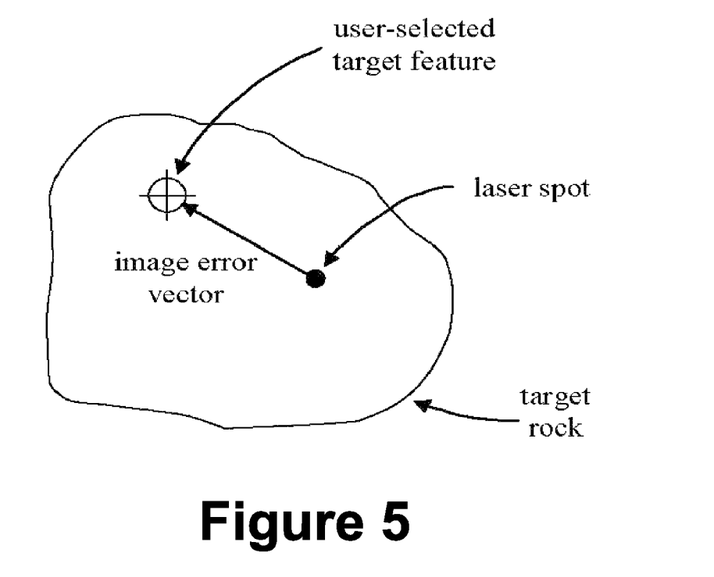
FIG. 5 illustrates an example target and positioning of a laser.

FIG. 5 illustrates an example target and positioning of a laser. To position the laser 110, an approximate relationship is established between the camera-space appearance of the laser spot and the corresponding pan and tilt angles of the PTU. This relationship can be established, updated, and refined based on sample pairs of camera-space locations of the laser spot along with joint poses of the PTU. Approximation of this relationship is sufficient for positioning the laser at the desired location. The user selects a target feature, and the system 100 then turns the laser on and identifies the laser's location in the camera space. Next an "image error vector" is computed (shown in FIG. 5), which is the camera-space distance from a current location of the laser spot to the target feature. The image error vector along with the pre-established relationship between the camera-space appearance of the laser and the pan and tilt angles are used to generate a new pose for the PTU. The PTU then moves to the new pose and the camera-space location of laser is found again. The system 100 determines if the laser spot is to within the prescribed tolerance of the target spot (in practice, about ½ of a pixel). If not, the system 100 makes another move of the PTU using the same process. Once the laser is at the desired location, then a camera-space location of the laser is found in the other camera(s). Thus, the camera-space location of the target point is now known in both cameras providing the information for the positioning experiment to proceed. Usually after a few moves the laser spot is located at the desired location, for example.

By physically projecting a laser spot on the target surface, the camera space target locations in all of the cameras can be referred to the same physical point. This correspondence may be necessary for achieving high-precision instrument placement. In addition, a camera-space target can be transferred from one camera to another using the laser 110. In practice, this is usually performed for transferring a target location from a left hazard camera to a right hazard camera (or from the left navigation camera to the right navigation camera). However, the transfer can also be completed from a left hazard camera to either or both of the navigation cameras 106, for example.

Once the camera-space target location has been established in at least two cameras, the system 100 estimates the 3-D location of the target and uses this information to create a trajectory for the system 100 to follow as well as for determining a target pose for the mobile manipulator 102. As the system 100 moves toward the target, the location of the target feature can be tracked in one or more of the cameras. The camera-space location of the feature will move and its camera-space appearance increases in size as the system 100 rover approaches the target. Likewise, since the PTU mounted laser pointer moves with the system 100, the physical location of the laser spot moves as the system 100 changes position and orientation.

As the system 100 moves toward the target, the system 100 tracks the location of the target feature from frame to frame of received images. The system 100 may stop periodically to re-position the laser 110. Once the laser spot is positioned, the other camera(s) acquires images and updates its camera-space target location. The updated camera-space targets are used to estimate a new 3-D target point that is used to generate an updated trajectory that will bring the task to completion. There are many possible strategies for determining when the system 100 should stop and update. For example, the system 100 may stop to update after traversing 25 cm. When the distance between the system 100 and the target is below 25 cm, the system 100 may make a few shorter moves until the system 100 moves to the final location for target engagement.

Target transfer can be thought of as enabling the system 100 to transition from a navigation camera-controlled test to a hazard camera-controlled test without any additional input from the user. First, a user selects the target for engagement using one of the pair of navigation cameras 106. The system 100 automatically moves the laser 110 spot to the target feature and acquires its location in the other navigation camera. The 3-D location for the target is estimated and used to create a trajectory for the system 100 to follow. As the system 100 follows the trajectory, the system 100 tracks the target feature. The system 100 will make stops every 25 cm, for example, to move the laser spot back onto the target feature. The camera-space targets are refreshed in images or displays of each of the pair of navigation cameras 106. This process repeats itself until the system 100 moves within 50 cm of the target, for example. When the system 100 reaches a position of less than 50 cm to the target, the system 100 will stop and issue a target update. The system 100 moves the laser spot to the target using information from one of the navigation cameras 106 for guidance. Once the laser spot is at the target, the system 100 acquires images from the pair of hazard cameras 104. These are used to find the camera-space location of the laser spot in both of the hazard cameras 104, which defines the camera-space targets for the pair of hazard cameras 104. Now that the camera-space target is available in both of the hazard cameras 104, the hazard cameras 104 are used to estimate the 3-D location of the target. The pair of navigation cameras 106 are no longer used for positioning the system 100. The system 100 has transitioned the target from the pair of navigation cameras 106 to the pair of hazard cameras 104.

Alternatively, or in addition, a static laser or light may be positioned to emit a light source onto the target, and the system 100 can maneuver toward the target. In this example, the system 100 would not require a laser source on the system 100. Any number of static light sources may be present in the field and used as a point of reference to emit a light onto the target. For example, a user in the field may position a light source on a target to direct the system 100 to maneuver toward the target. Thus, the laser may be independent from the system 100 as manually operated by a user, for example.

Next, autonomous and precise instrument placement can be achieved. For the purposes of comparing precision levels a number of natural feature positioning tests were conducted with the system 100 without using the target transfer algorithm. Some tests were run using only the hazard cameras 104 for control; others were run using only the navigation cameras 106 for control. For these tests, a distance of separation from the tool to the surface of the target is determined. The xarm error is defined as the difference between the distance of separation specified and the actual distance of separation during the test. Once the tool is deployed, a measure of the distance from the end of the tool to the surface of the target is made. This quantity is compared with the distance specified.

There can be several sources of error introduced in the natural features tests that are not present in the fiducial tests. The first potential source of error is the feature selection error. The user selects the target feature for engagement. However, the user can select this feature only to within 1 pixel. If the system 100 is close to the target, this 1 pixel may represent a region that is at least 1.6 mm square in physical space. As the system 100 moves further from the target, the pixel/mm resolution decreases. Thus, even when the system 100 is close to the target, it is difficult to specify the exact feature selected to within 1 mm. And uncertainty associated with the target selection increases as the distance of the system 100 to the target increases.

A second source of $y_{arm}$-$z_{arm}$ plane error is introduced in the tracking of the feature. As the system 100 moves towards the target, the camera-space appearance of the feature changes. Further, a third source of $y_{arm}$-$z_{arm}$ plane error is introduced in the measurement stage. With the fiducials, in-plane positioning error can be measured since the system 100 actually makes a mark on the fiducial. A distance between the mark and the center of the fiducial is measured. When the system 100 engages a natural target such as a feature on the rock, in-plane error is difficult to measure since there is no clear reference frame, and there is no mark made on a surface of the target.

In an effort to reduce effects of measurement error for the $y_{arm}$-$z_{arm}$ plane error, a rough reference procedure for measuring $y_{arm}$-$z_{arm}$ plane error can be used. The procedure involves using a laser pointer mounted on a stationary tripod. At the beginning of a test, the user turns on the laser and directs the laser toward a feature on the target. The user uses the laser to assist in clicking on the feature of interest. Then the tripod-mounted laser is turned off. The positioning experiment is conducted—from the perspective of the system 100, there is no change introduced by this procedure. When the system 100 has deployed the mobile manipulator 102, the tripod-mounted laser is illuminated. Since the laser has not moved, the laser spot is projected at the same feature as the laser was when the user selected the target. The user can measure the $y_{arm}$-$z_{arm}$ plane error by measuring a distance from the tip of the mobile manipulator 102 to the center of the laser spot. The method affords a means of measuring the $y_{arm}$-$z_{arm}$ plane error to within approximately ½ cm.

A series of natural feature positioning tests were performed using the pair of hazard cameras 104 for control. Another series of tests were performed using the pair of navigation cameras 106 for control. In these experiments, the system 100 engaged a user-selected feature on the target. The features were classified as either "bland" or "distinct" depending upon how the feature appeared in the images. It is expected that the $y_{arm}$-$z_{arm}$ plane error should be less when engaging distinct targets versus bland targets. Table 2 below includes a summary of the positioning results.

TABLE 2

Summary of Positioning Test Results Using Natural Feature Targets

| | Hazcam | Navcam |
|---|---|---|
| Average $x_{arm}$ Error (cm) | 0.0053 | −0.2600 |
| Std Dev. $x_{arm}$ Error (cm) | 0.0510 | 0.1300 |
| Average $y_{arm}$ Error (cm) | 0.0056 | 0.1500 |
| Std Dev. $y_{arm}$ Error (cm) | 0.0110 | 0.2900 |
| Average $z_{arm}$ Error (cm) | −0.1688 | −0.9400 |
| Std Dev. $z_{arm}$ Error (cm) | 0.0312 | 0.5800 |

Comparing the results listed in Table 2 with the positioning results from the fiducial tests as listed in Table 1 show a number of trends. For example, the xarm error for the hazard cameras does not increase significantly when using a natural feature for the target. The standard deviation for these natural features tests is still about ½ mm. While the $y_{arm}$-$z_{arm}$ plane error does not increase significantly for the hazard camera either, the xarm error can be a critical error. The navigation camera loses precision particularly in the $y_{arm}$-$z_{arm}$ plane, when controlling natural features tests versus fiducial tests.

Upon completing natural feature positioning tests, a series of full target transfer tests were conducted. Table 3 below gives the average errors and standard deviations by component.

TABLE 3

Summary of Positioning Test Results for Target Transfer Tests

| | Bland Target | Distinct Target |
|---|---|---|
| Average $x_{arm}$ Error (cm) | −0.2144 | −0.2291 |
| Std Dev. $x_{arm}$ Error (cm) | 0.0778 | 0.0634 |
| Average $y_{arm}$ Error (cm) | −0.0450 | −0.0400 |
| Std Dev. $y_{arm}$ Error (cm) | 0.8180 | 0.3950 |
| Average $z_{arm}$ Error (cm) | −2.1700 | −1.6700 |
| Std Dev. $z_{arm}$ Error (cm) | 0.7196 | 0.6019 |

The results of the target transfer tests illustrate an increase in the zarm direction error as compared to the test results listed in Table 2. This is due in part to the fact that in these tests the target was selected when the system 100 was at a greater distance from the target than was the case for the hazard and navigation camera tests results listed in Table 2. The yarm direction error is small, e.g., under 1 mm. There is a slight increase in the xarm direction error, but this error is still, e.g., about 2 mm.

In example embodiments, a maximum range for conducting this set of experiments was 4.25 m due to the downlook angle of the cameras. If the navigation cameras 106 were lowered and the downlook angle was reduced or an additional set of cameras are added, the system 100 could perform high-precision, reliable instrument placement from about 5 m and beyond. Experiments using 3 sets of cameras have been completed from distances of 8 m.

As mentioned, the PTU mounted laser pointer is used to facilitate the process of finding a camera space location of the target feature in a secondary controlling camera, e.g., first selecting the target feature in a primary (or right) controlling camera and locating the target in a secondary camera (or left). A second use of the laser in a target transitioning test is to transfer the target from the two navigation cameras to two hazard cameras.

Target information can be transferred from one set of stereo-pair cameras to another without the use of the laser. When the system 100 reaches a position at which the system 100 transfers the target from the navigation cameras 106 to the hazard cameras 104, e.g., about 50 cm away from the target, camera-space locations for the target are found in images of the navigation cameras 106. These locations are used to estimate the 3-D location of the target, $\bar{p}$. The value for $\bar{p}$ is then used to define the camera-space target locations for the feature in the reference frames of the pair of hazard cameras 104. This may be completed by using the hazard cameras' camera model parameters and Equation 1.

A series of eight experiments were conducted using this algorithm to transfer target information from one set of stereo-pair cameras to another without the use of the laser. Table 4 below gives average errors and standard deviations by component of the experiments.

TABLE 4

| Average $x_{arm}$ Error (cm) | −0.0309 | 0.2383 |
|---|---|---|
| Std Dev. $x_{arm}$ Error (cm) | 0.6975 | 0.2370 |
| Average $y_{arm}$ Error (cm) | 0.4000 | −0.7167 |
| Std Dev. $y_{arm}$ Error (cm) | 0.9445 | 1.7140 |
| Average $z_{arm}$ Error (cm) | −0.7667 | 0.6000 |

TABLE 4-continued

| | | |
|---|---|---|
| Std Dev. $z_{arm}$ Error (cm) | 1.3201 | 0.6957 |

Summary of Positioning Test Results for Target Transfer Tests without Using the Laser Pointer As discussed above, the system 100 needs camera-space target location in at least two cameras to estimate the 3-D location of the target. The 3D location is used to create the trajectory for the system 100 as well as to resolve the pose of the mobile manipulator 102. In practice, AGATE uses either the camera-space targets in the hazard cameras or in the navigation cameras, but not both. However, it is possible to use more than two cameras for the target estimation procedure, for instance, using the four cameras that comprise the hazard and navigation cameras. It is also possible to estimate the 3-D target location using only one of the hazard cameras with one or more of the navigation cameras. An advantage of this flexibility in using many camera combinations to estimate the target location is that the system 100 retains the capability to estimate the target location and thus engage the target even if one of the cameras becomes inoperable.

A series of 40 positioning tests using fiducials was conducted to test the algorithms for using multiple cameras. Ten tests were run with each of the four options: a) using only the hazard cameras, b) using the hazard cameras and the navigation cameras, c) using the hazard cameras and side mounted cameras, and d) using the hazard cameras, the navigation cameras, and the side mounted cameras. The results of these tests are listed below in Table 5. The test results demonstrate that the use of multiple cameras does not affect adversely the precision of the system.

TABLE 5

| | Hazcam | Hazcam + Navcam | Hazcam + Oldcam | Hazcam + Navcam + Oldcam |
|---|---|---|---|---|
| Average $x_{arm}$ Error (cm) | 0.0075 | −0.0050 | 0.0000 | −0.0150 |
| Std Dev. $x_{arm}$ Error (cm) | 0.0354 | 0.0369 | 0.0310 | 0.0394 |
| Average $y_{arm}$ Error (cm) | 0.0296 | 0.0187 | −0.0085 | 0.0147 |
| Std Dev. $y_{arm}$ Error (cm) | 0.0277 | 0.0207 | 0.0310 | 0.0192 |
| Average $z_{arm}$ Error (cm) | −0.0788 | −0.0782 | −0.0936 | −0.1161 |
| Std Dev. $z_{arm}$ Error (cm) | 0.0503 | 0.0542 | 0.0401 | 0.0195 |

Summary of Positioning Test Results for Fiducial Targets Using Multiple Cameras in Target Estimation Procedure It is also possible to determine how sensitive the overall precision of the system 100 is to error within operating parameters. For example, if part of the system 100 were to be damaged during use, the AGATE algorithm for instrument placement that is based on the principles of MCSM is reasonably robust to errors since the system constantly recalibrates itself based on where the manipulator features (such as fiducials) appear in the images taken by the cameras.

To test the sensitivity of a certain operating parameter, the value for the parameter is altered to "include" an error. Then the system 100 recalibrates itself and conducts a series of positioning experiments using fiducials for targets. Sensitivity tests have been conducted on the length of the arm as well as the effective radius of the drive wheels. The results of the sensitivity tests for the length of the arm are listed in Table 6.

TABLE 6

Summary of Sensitivity Tests for the Length of the Arm

| | ±0% Error | ±5% Error | ±10% Error |
|---|---|---|---|
| Average $x_{arm}$ Error (cm) | −0.0238 | 0.0692 | 0.1417 |
| Std Dev. $x_{arm}$ Error (cm) | 0.0329 | 0.0636 | 0.0645 |
| Average $y_{arm}$ Error (cm) | −0.0091 | 0.0034 | 0.0034 |
| Std Dev. $y_{arm}$ Error (cm) | 0.0254 | 0.0083 | 0.0083 |
| Average $z_{arm}$ Error (cm) | −0.1547 | 0.0961 | 0.0665 |
| Std Dev. $z_{arm}$ Error (cm) | 0.0401 | 0.1052 | 0.0389 |

From these test results, it can be seen that when the length of the arm is mischaracterized by 10%, the error in the xarm direction grows to about 0.1 cm and the standard deviation of the error is also about 0.1 cm. For example, for an arm that has a length of roughly 70 cm, a 10% mischaracterization is 7 cm. With such a large amount of error in characterizing the length of the arm, there is a relatively small increase in positioning error. This demonstrates the robustness AGATE positioning method to error in characterizing the length of the arm since the error in positioning is much less than the error in characterizing the length of the arm.

A similar set of experiments was conducted for changing a wheel radius. Nominally, the wheel radius is 12.7 cm. Table 7 shows the results of the sensitivity experiments. There is no appreciable change in the positioning error when the wheel radius is mischaracterized by 10%. Again, this demonstrates the robustness AGATE positioning method.

TABLE 7

Summary of Sensitivity Tests for the Length of the Arm

| | ±0% Error | ±5% Error | ±10% Error |
|---|---|---|---|
| Average $x_{arm}$ Error (cm) | −0.0238 | −0.0167 | 0.0292 |
| Std Dev. $x_{arm}$ Error (cm) | 0.0329 | 0.0408 | 0.0246 |
| Average $y_{arm}$ Error (cm) | −0.0091 | 0.0295 | 0.0301 |
| Std Dev. $y_{arm}$ Error (cm) | 0.0254 | 0.0159 | 0.0135 |
| Average $z_{arm}$ Error (cm) | −0.1547 | −0.1376 | −0.1151 |
| Std Dev. $z_{arm}$ Error (cm) | 0.0401 | 0.0147 | 0.0290 |

Figure 6:
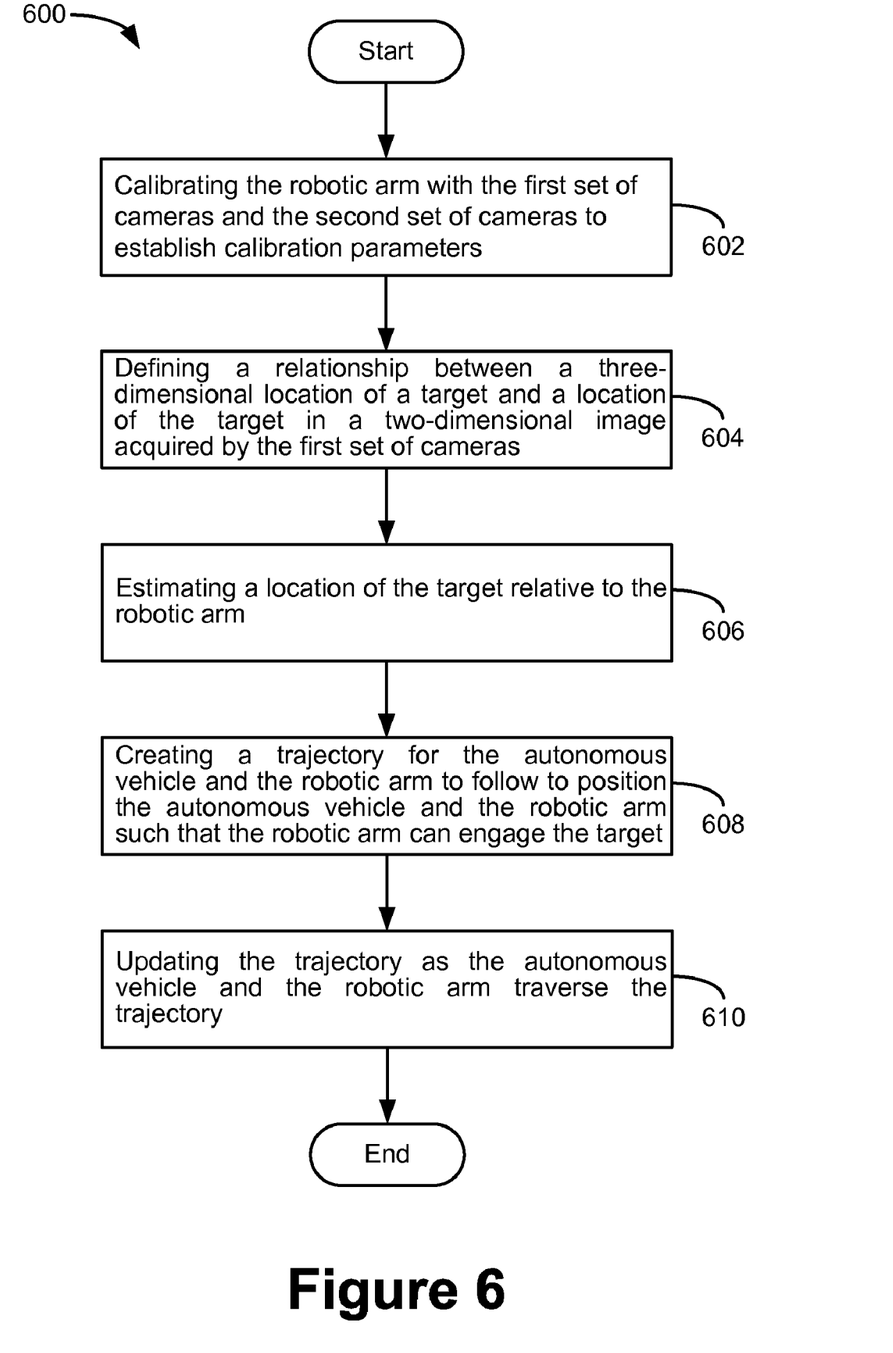
FIG. 6 is a flowchart illustrating functional steps of an example method to operate an autonomous vehicle.

Within example embodiments described above, a method for operating an autonomous vehicle is described. FIG. 6 is a flowchart illustrating functional steps of a method 600 to operate the autonomous vehicle. It should be understood that each block in the flowchart may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Initially, as shown at block 602, the robotic arm, the first set of cameras, and the second set of cameras are calibrated to establish calibration parameters. The calibration parameters describe a relationship between a location of features of the robotic arm in a two-dimensional image acquired by the first set of cameras and the second set of cameras and a three-dimensional position of the features of the robotic arm.

Next, as shown at block 604, a relationship between a three-dimensional location of a target and a location of the target in a two-dimensional image acquired by the first set of cameras is defined. For example, the relationship may be established using the CAHVOR parameters, as discussed above.

Using the calibration parameters and the relationship between the three-dimensional location of the target and the location of the target in the two-dimensional image acquired by the first set of cameras, a location of the target relative to the robotic arm is estimated, as shown at block 606. For example, the calibration parameters establish known locations of the system relative features in images acquired by the cameras. Thus, once the target is in view within the images acquired by the cameras, a distance to the target can be estimated using the camera models and the minimization procedure described above. Following, a trajectory is created for the autonomous vehicle and the robotic arm to follow to position the autonomous vehicle and the robotic arm such that the robotic arm can engage the target, as shown at block 608. The trajectory may include both a path for the vehicle to travel, and a movement for the robotic arm including an angle at which to lower or raise the arm, for example.

The trajectory can be updated as the autonomous vehicle and the robotic arm traverse the trajectory, as shown at block 610. For example, as the autonomous vehicle approaches the target, the cameras may be able to acquire more detailed images of the target, and the system may be able to more precisely estimate a location of the target. Thus, the trajectory can be updated accordingly.

Figure 7:
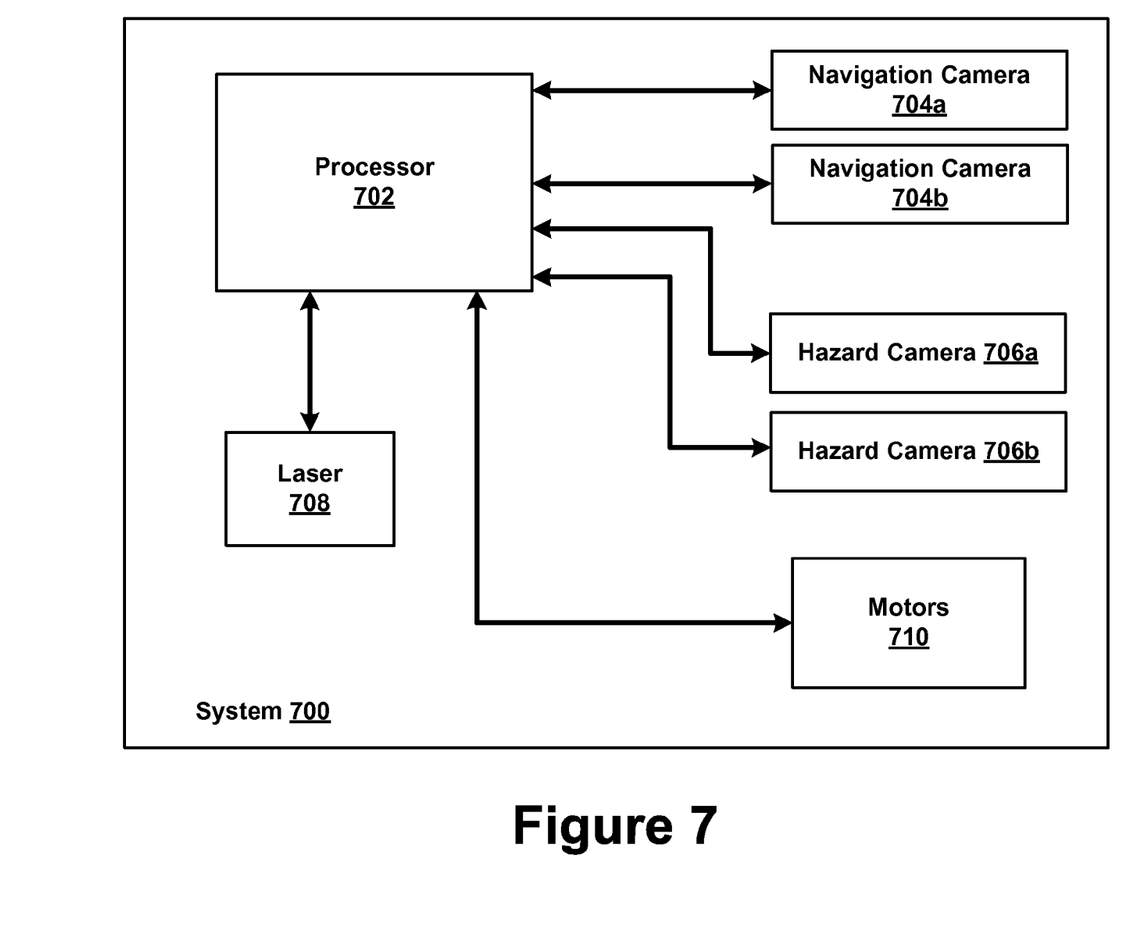
FIG. 7 is a block diagram illustrating an example system for executing the method of FIG. 6.

FIG. 7 is a block diagram illustrating an example system 700 for executing the method 600 of FIG. 6. The system 700 may be included on an autonomous vehicle, for example. The system 700 includes a processor 702, navigation cameras 704*a-b*, hazard cameras 706*a-b*, a laser or light emitting device 708, and motors 710.

The processor 702 accesses memory (not shown) to execute any of the functions described in the method of FIG. 6 and that may be stored in the memory, for example. The memory may include main memory and secondary storage. The main memory may include random access memory (RAM), and can also include any additional or alternative memory device or memory circuitry. Secondary storage can be provided as well and may be persistent long term storage, such as read only memory (ROM), optical or magnetic disks, compact-disc read only memory (CD-ROM), or any other volatile or non-volatile storage systems. The memory may include more software functions as well, for example, executable by the processor 702, and the software functions may be provided using machine language instructions or software with object-oriented instructions, such as the Java programming language. However, other programming languages (such as the C++ programming language for instance) could be used as well.

In general, it should be understood that the system 700 could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data. It should also be noted that the system 700 generally executes application programs resident at system 700 under the control of an operating system, for example. It will be apparent to those of ordinary skill in the art that the methods described herein may be embodied in a computer program product that includes one or more computer readable media, as described as being present within the system 700. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The navigation cameras 704*a-b* and the hazard cameras 706*a-b* may be located at different locations on the system and are connected to the processor 702 to provide acquired image data to the processor 702. Further, the processor 702 may communicate information between each of the navigation cameras 704*a-b* and the hazard cameras 706*a-b*, for example.

The laser 708 is also connected to the processor 702 and may be controlled by the processor 702 to emit a light source in a given direction and for a given duration, for example.

The motors 710 are also connected to the processor 702 and may be controlled by the processor 702 to control movement of the system 700 or to control movement of objects connected to the system 700, such as a robotic arm for example.

The system 700 generally can range from a hand-held device, laptop, or personal computer to a larger computer such as a workstation and multiprocessor. The system 700 may also include an input device, such as a keyboard and/or a two or three-button mouse, if so desired. One skilled in the art of computer systems will understand that the example embodiments are not limited to any particular class or model of computer employed for the system 700 and will be able to select an appropriate system.

In alternative embodiments, a third set of cameras may be used to help operate the autonomous vehicle. Experiments were conducted with the system 100 beginning roughly 3-8 m away from the target and using three sets of cameras, referred to as panoramic cameras (PANCAMS), navigation cameras (NAVCAMS), and hazard cameras (HAZCAMS). The exact starting location and the target were varied from test to test. Note that the algorithm is restricted to starting locations from which the PANCAMS can see the target, since the target is specified using a PANCAM image. It should be noted that from this range, the spatial resolution of the PANCAMS is approximately 13 mm/pixel.

A series of 20 test runs were carried out using a laser-based tracking means. In these tests the rover began roughly 8 m away from the target location. In all 20 tests, the rover successfully positioned its instrument at the target rock selected. The accuracy of end-effector placement is measured in two ways—'in-plane' error is in the plane tangent to the target surface, and 'out-of-plane' error is perpendicular to the target surface. The average out-of-plane error was measured to be 1.1 mm, with a standard deviation of 1.5 mm. The average in-plane error was measured to be 24.6 mm, with a standard deviation of 12.8 mm.

A series of 20 tests using a non-laser based tracking means were also carried out. The system was able to handoff the target from the PANCAMS to the NAVCAMS. For the successful test runs, the average out-of-plane error was 5.1 mm. The average in-plane error was 30.4 mm.

Many tests using both methods from a range of 4 m or less have also been conducted. In such cases average errors using both methods were less than 3 mm out-of-plan and 10 mm in-plane.

Experimental results have shown that a mobile manipulator can autonomously position its tool tip a specified distance from a visually-specified target. The target was specified from a distance of approximately 8 m or more, with a resolution of 13 mm/pixel. To accurately model the typical NASA systems, three sets of cameras were used for these experiments, with increasingly smaller focal lengths. Two approaches were tested for transferring of target information among cameras.

The first was the use of a pan-tilt mounted laser. This laser was used to 'light up' the target, allowing for accurate transfer of target information. Final out-of-plane accuracy was on average approximately 1 mm with this approach, and in-plane accuracy was about 25 mm. Thus, the system presented here demonstrates the ability to control the instrument placement relative to a target in the critical, out-of-plane, direction with a precision that far exceeds the camera/physical space resolution when the target was selected. This method was successful in every trial.

The second approach was to eliminate the use of the laser and transfer target information using only features in the images themselves. This approach was successful in the trials, and resulted in an average out-of-plane error of about 5 mm and in-plane error of about 30 mm.

Example embodiments of the autonomous go and touch exploration (AGATE) system will enable precision mobile manipulation from distances on the order of eight meters, for example, and will be applicable to a variety of applications, such as planetary exploration rovers. As another example, AGATE will enable computer-controlled forklifts to automatically engage pallets located atop high shelves by providing the means for transferring visual target information from cameras on the forklift body to cameras attached to the forks. This capability will increase productivity and reduce costs by decreasing the time required for engaging pallets atop high shelves as well as by reducing product damage and increasing workplace safety. AGATE could also be used to control other commercial mobile manipulators, such as backhoes, cherry-pickers, etc.

The following references are entirely incorporated by reference herein and may include additional explanation of details of embodiments described above.

M. Maimone, A. Johnson, Y. Cheng, R. Willson, L Matthies, "Autonomous Navigation Results from the Mars Exploration Rover (MER) Mission," *Springer Tracts in Advanced Robotics*, Vol. 21, pp. 3-13 Mar. 2006.

Donald B. Gennery, "Least-Squares Camera Calibration Including Lens Distortion and Automatic Editing of Calibration Points," in *Calibration and Orientation of Cameras in Computer Vision*, A. Grun and T. Huang Editors, Springer Series in Information Sciences, Vol. 34, Springer-Verlag, pp. 123-136, July 2001.

E. T. Baumgartner, R. G. Bonitz, J. P. Melko, L. R. Shiraishi, C. Leger, and A. Trebi-Ollennu, "Mobile Manipulation for the Mars Exploration Rovers," *IEEE Robotics and Automation Magazine*, Vol. 13, No. 2, 2006.

T. Huntsberger, et al., "Rover Autonomy for Long Range Navigation and Science Data Acquisition on Planetary Surfaces," in *Proc. 2002 IEEE Int. Conf on Robotics and Automation*, pp. 3161-3168, 2002.

E. T. Baumgartner, C. Leger, T. A. Huntsberger, and P. S. Schenker, "Sensor-Fused Navigation and Manipulation from a Planetary Rover," *Sensor Fusion and Decentralized Control in Autonomous Robotic Systems*, SPIE Proc. Vol. 3523, pp. 58-66, Boston, Mass., October, 1998.

M. Seelinger, J. D. Yoder, E. Baumgartner, S. Skaar. "High-Precision Visual Control of Mobile Manipulators," IEEE Trans. on Robotics and Automation, Vol. 18, No. 6, pp. 957-965, 2002.

M. Seelinger, J. D Yoder, S. Skaar, U.S. Pat. No. 6,194,860 B1, "Mobile Camera-Space Manipulation," Feb. 27, 2001.

P. Backes, A. Diaz-Calderon, M. Robinson, M. Bajracharya, and D. Helmick, "Automated Rover Positioning and Instrument Placement," IEEE Aerospace Conference, March 2005.

T. Huntsberger, Y. Cheng, A. Stroupe, and H. Aghazarian. "Closed Loop Control for Autonomous Approach and Placement of Science Instruments by Planetary Rovers" IEEE Conf. on Intelligent Robots and Systems IROS2005, Edmonton, Canada, Aug. 2-6, 2005.

Pedersen, L.; Smith, D. E.; Deans, M.; Sargent, R.; Kunz, C.; Lees, D.; Rajagopalan, S., "Mission Planning and Target Tracking for Autonomous Instrument Placement," Aerospace, 2005 IEEE Conference, 5-12 Mar. 2005 Page(s):1-18.

David G. Lowe, "Distinctive image features from scale-invariant keypoints," *International Journal of Computer Vision*, Vol. 60, No. 2 pp. 91-110, 2004.

J. D. Yoder and M. Seelinger, "Visual Coordination of Heterogeneous Mobile Manipulators," *Springer Tracts in Advanced Robotics*, Vol. 21, pp. 387-396, March 2006.

Bruce D. Lucas and Takeo Kanade. An Iterative Image Registration Technique with an Application to Stereo Vision. International Joint Conference on Artificial Intelligence, pages 674-679, 1981.

S. Smith, J. Brady, Susan—a new approach to low level image processing, Intl. Journal of Computer Vision. Vol. 23, No. 1, pages 45-78, 1997.

Y. Ke and R. Sukthankar. PCA-SIFT: A more distinctive representation for local image descriptors. In *Proc. of the IEEE Conf on Computer Vision and Pattern Recognition* (CVPR), 2004.

Generally, the present application provides an approach to accurately position a mobile manipulator from distances that are large relative to the scale of the manipulator. Transferring images of the target from one set of cameras to another helps to enable positioning of mobile manipulator. The means for target transfer from one system to another could facilitate the cooperation of multiple robots, or at the very least between remote cameras and cameras located on the mobile robot system. For example, a commercial application along these lines is that of autonomous unloading of a tractor-trailer. A stationary set of cameras could be positioned at the back end of a tractor-trailer, and this set of cameras could identify the pallets in the back of the trailer. The visual information could be transferred to an automatic forklift or team of forklifts for the automatic unloading of the trailer. Other examples are possible as well.

It should be understood that the arrangements described herein are for purposes of example only. As such, those skilled in the art will appreciate that other arrangements and other logic or circuit elements can be used instead, and some elements may be omitted altogether according to the desired results. Further, many of the elements that are described are functional entities that may be implemented as discrete or distributed components or in conjunction with other components, in any suitable combination and location.

It is intended that the foregoing detailed description be regarded as illustrative rather than limiting, and it is intended to be understood that the following claims including all equivalents define the scope of the invention.

What is claimed is:

1. A method for operating an autonomous vehicle that includes a manipulator and one or more sets of cameras on the autonomous vehicle, the method comprising:

calibrating the manipulator with the one or more sets of cameras to establish calibration parameters describing a relationship between a location of features of the manipulator in a two-dimensional image acquired by the one or more sets of cameras and a three-dimensional position of the features of the manipulator, wherein the one or more sets of cameras comprises a first set of cameras and a second set of cameras;

determining a first camera-space target projection based on a relationship between a three-dimensional location of a target and a location of the target in a given two-dimensional image acquired by the first set of cameras;

using the calibration parameters and the first camera-space target projection to estimate a location of the target relative to the manipulator;

creating a trajectory for the autonomous vehicle and the manipulator to follow to position the autonomous vehicle and the manipulator such that the manipulator can engage the target based on the three-dimensional location of the target due to the first camera-space target projection in the relationship between the three-dimensional location of the target and the location of the target in the given two-dimensional image acquired by the first set of cameras;

updating the first camera-space target projection based on subsequent two-dimensional images acquired by the first set of cameras as the autonomous vehicle traverses the trajectory;

based on a distance of the autonomous vehicle to the target, transitioning the target from the first set of cameras to the second set of cameras;

determining a second camera-space target projection based on a relationship between a three-dimensional location of the target and a location of the target in a given two-dimensional image acquired by the second set of cameras; and updating the trajectory for the autonomous vehicle and the manipulator to follow based on the second camera-space target projection, wherein transitioning the target from the first set of cameras to the second set of cameras comprises:
  using the given two-dimensional image acquired by the first set of cameras, providing a laser onto the target;
  receiving the given two-dimensional image of the target acquired by at least one of the second set of cameras; and
  determining a camera-space location of the laser in the given two-dimensional image acquired by the second set of cameras based on a location of the laser in the image.

2. The method of claim 1, wherein the first set of cameras on the autonomous vehicle are long-range viewing cameras and the second set of cameras on the autonomous vehicle are short-range viewing cameras.

3. The method of claim 1, wherein transitioning the target from the first set of cameras to the second set of cameras comprises:
  positioning a light source to emit a light substantially near the location of the target;
  at least one of the second set of cameras acquiring an image including the light;
  updating the three-dimensional location of the target based on a location of the light in the image.

4. The method of claim 1, further comprising determining a configuration of the system to position the manipulator approximately at the three-dimensional location of the target.

5. The method of claim 1, further comprising:
  positioning a light source to emit a light substantially near the location of the target;
  identifying the light within images produced by one of the first set of cameras and the second set of cameras; and
  defining the location of the target in the images produced by one of the first set of cameras and the second set of cameras.

6. The method of claim 1, wherein calibrating comprises:
  moving the manipulator through a series of positions;
  at each positions, acquiring images from the cameras and recording corresponding angles and positions of the manipulator;
  in each image, identifying a camera-space location of a feature of the manipulator;
  establishing parameters describing a relationship between the camera-space location of the feature of the manipulator and a three-dimensional position of the feature of the manipulator.

7. The method of claim 1, wherein determining a relationship between a three-dimensional location of a target and a location of the target in a given two-dimensional image acquired by the first set of cameras comprises using the CAHVOR camera model.

8. The method of claim 7, wherein the CAHVOR camera model includes six vectors of three parameters each for a total of eighteen camera model parameters comprising $\underline{c}=\{c0,c1,c2\}$, $\underline{a}=\{a0,a1,a2\}$, $\underline{h}=\{h0,h1,h2\}$, $\underline{v}=\{v0,v1,v2\}$, $\underline{o}=\{o0,o1,o2\}$, $\underline{r}=\{r0,r1,r2\}$, where the location of the target in the two-dimensional image is described with coordinates (x, y) and the three-dimensional location of the target is described by vector $\underline{p}$, and where $$x = \frac{(\underline{p}'-\underline{c})\times \underline{h}}{(\underline{p}'-\underline{c})\times \underline{a}},\ y = \frac{(\underline{p}'-\underline{c})\times \underline{v}}{(\underline{p}'-\underline{c})\times \underline{a}},\ \underline{p}' = \underline{p}+\mu\underline{\lambda},\ \mu = r_0 + r_1\tau + r_2\tau^2,$$

$$\tau = \frac{\underline{\lambda}\times\underline{\lambda}}{\zeta^2},\ \underline{\lambda} = \underline{p}-\underline{c}-\zeta\underline{o},\ \text{and}\ \zeta = (\underline{p}-\underline{c})\times\underline{o}.$$

9. The method of claim 1, wherein creating the trajectory for the autonomous vehicle and the manipulator to follow comprises:
  determining a position relative to the autonomous vehicle at which to move the manipulator;
  determining coordinates of the location of the target; and
  determining a given trajectory for the autonomous vehicle and instructions for following the trajectory.

10. The method of claim 1, further comprising:
  receiving a second two-dimensional image acquired by the one or more sets of cameras; and
  updating the calibration parameters to describe a relationship between a location of features of the manipulator in the second two-dimensional image and a current three-dimensional position of the features of the manipulator.

11. A method for operating an autonomous vehicle that includes a manipulator and one or more sets of cameras on the autonomous vehicle, the method comprising:
  calibrating the manipulator with the one or more sets of cameras to establish calibration parameters describing a relationship between a location of features of the manipulator in a two-dimensional image acquired by the one or more sets of cameras and a three-dimensional position of the features of the manipulator, wherein the one or more sets of cameras comprises a first set of cameras and a second set of cameras;
  determining a first camera-space target projection based on a relationship between a three-dimensional location of a target and a location of the target in a given two-dimensional image acquired by the first set of cameras;

using the calibration parameters and the first camera-space target projection to estimate a location of the target relative to the manipulator;

creating a trajectory for the autonomous vehicle and the manipulator to follow to position the autonomous vehicle and the manipulator such that the manipulator can engage the target based on the three-dimensional location of the target due to the first camera-space target projection in the relationship between the three-dimensional location of the target and the location of the target in the given two-dimensional image acquired by the first set of cameras;

updating the first camera-space target projection based on subsequent two-dimensional images acquired by the first set of cameras as the autonomous vehicle traverses the trajectory;

based on a distance of the autonomous vehicle to the target, transitioning the target from the first set of cameras to the second set of cameras;

determining a second camera-space target projection based on a relationship between a three-dimensional location of the target and a location of the target in a given two-dimensional image acquired by the second set of cameras; and updating the trajectory for the autonomous vehicle and the manipulator to follow based on the second camera-space target projection, wherein creating the trajectory for the autonomous vehicle and the manipulator to follow comprises:

using the first camera-space target projection when the distance between the autonomous vehicle and the target is above a threshold distance; and using the second camera-space target projection when the distance between the autonomous vehicle and the target is below a threshold distance.

* * * * *